(12) United States Patent
Westra et al.

(10) Patent No.: US 11,452,343 B2
(45) Date of Patent: Sep. 27, 2022

(54) SHOULDER STRAP POSITIONER

(71) Applicant: HTS Hans Torgersen & Sonn AS, Kroederen (NO)

(72) Inventors: Hugo Westra, Rotterdam (NL); Marloes Koenraads, Amsterdam (NL)

(73) Assignee: HTS Hans Torgersen & Sønn AS, Krøderen (NO)

( * ) Notice: Subject to any disclaimer, the term of this patent is extended or adjusted under 35 U.S.C. 154(b) by 0 days.

(21) Appl. No.: 16/766,300

(22) PCT Filed: Nov. 23, 2018

(86) PCT No.: PCT/EP2018/082407
§ 371 (c)(1),
(2) Date: May 22, 2020

(87) PCT Pub. No.: WO2019/101942
PCT Pub. Date: May 31, 2019

(65) Prior Publication Data
US 2020/0367610 A1  Nov. 26, 2020

(30) Foreign Application Priority Data
Nov. 24, 2017 (NO) .................................. 20171884

(51) Int. Cl.
*A44B 11/25* (2006.01)
*A47D 15/00* (2006.01)
(Continued)

(52) U.S. Cl.
CPC ...... *A44B 11/2542* (2013.01); *A44B 11/2534* (2013.01); *A47D 15/006* (2013.01);
(Continued)

(58) Field of Classification Search
CPC ............ A44B 11/2592; A44B 11/2584; A44B 11/2588; Y10T 24/4042; Y10T 24/4032;
(Continued)

(56) References Cited

U.S. PATENT DOCUMENTS 5,873,635 A    2/1999 Merrick
2005/0225157 A1  10/2005 Patrizi et al.
(Continued)

FOREIGN PATENT DOCUMENTS

EP           0447098        9/1991

*Primary Examiner* — Robert Sandy
*Assistant Examiner* — Michael S Lee
(74) *Attorney, Agent, or Firm* — Christian D. Abel

(57) ABSTRACT

The present invention relates to a shoulder strap positioner for releasably connecting a first and a second strap of a child restraining seat harness, where the shoulder strap positioner comprises a male member configured to be connected to a first strap of the child restraining seat harness and a female member configured to be connected to a second strap of the child restraining seat harness, and where the male member can be removably connected to the female member (1b), where the female member comprises a receptacle provided with an opening for insertion of the male member, the opening being provided over a part of a circumference of the female member, where at least one rib is provided over a part of the opening, and where the male member comprises an tongue provided with a groove, the male and female members being locked to each other through a movement of the male member towards the at least one rib, the at least one rib being brought into contact and accommodated in the groove through this movement, and released from each other through a movement of the male member away from the at least one rib.

18 Claims, 14 Drawing Sheets

Figure 1A:
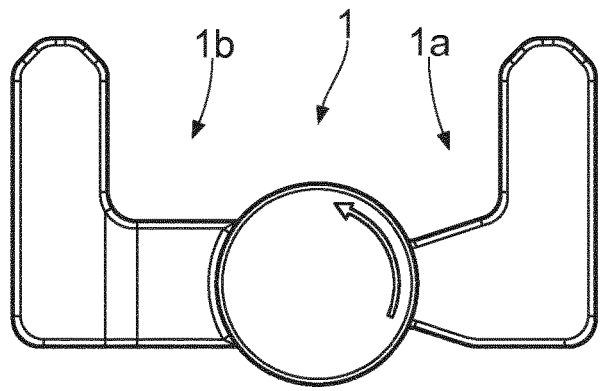

(51) Int. Cl.
 *B60N 2/28* (2006.01)
 *B60R 22/12* (2006.01)
(52) U.S. Cl.
 CPC ............ *B60N 2/2812* (2013.01); *B60R 22/12* (2013.01); *B60N 2002/2815* (2013.01); *Y10T 24/4522* (2015.01)
(58) Field of Classification Search
 CPC . Y10T 24/4028; Y10T 24/4002; Y10T 24/40; Y10T 24/4736; Y10T 24/4745; Y10T 24/45267; Y10T 24/45241; Y10T 24/4522; Y10T 24/45215
 See application file for complete search history.

(56) References Cited

U.S. PATENT DOCUMENTS

| | | | |
|---|---|---|---|
| 2006/0070215 A1* | 4/2006 | Sung | A44B 11/263 |
| | | | 24/615 |
| 2007/0102990 A1 | 5/2007 | Smith et al. | |
| 2014/0103697 A1 | 4/2014 | Mason et al. | |
| 2017/0172262 A1* | 6/2017 | Paik | A45F 3/047 |
| 2019/0059331 A1* | 2/2019 | Lai | A44B 11/2592 |

\* cited by examiner

SHOULDER STRAP POSITIONER

The present invention relates to a child safety seat integrated into a vehicle passenger seat or separate therefrom, and more specifically a child safety seat having a connecting device to removably secure child seat harness belts together.

It is well-known that many standard vehicle restraint systems do not adequately protect children from injury during vehicle collisions. For example, shoulder seat belts often do not adjust sufficiently to accommodate a child, sometimes resulting in the shoulder seat belt being dangerously positioned at the child's neck. To remedy this problem, supplemental child vehicle restraints, such as child safety seat assemblies, have become an increasingly popular way of properly restraining children during vehicle collisions, thereby reducing injuries resulting therefrom. Instead of the conventional shoulder seat belt restraint, child safety seat assemblies usually employ some form of harness that extends across the entire torso of the child.

A child restraint system may be built into a vehicle passenger seat or may be included within a child seat restable upon the vehicle passenger seat. A variety of different types of harness systems are available at the market today. Typically, the restraint system includes a pair of webs or straps extendable downwardly over the shoulders and against the chest of the child to a pair of tongues or a single tongue, which is, in turn, lockingly engaged with a buckle secured to the child safety seat assembly. In order to position the webs or straps together across the child's chest, quick disconnect connectors usually are utilized.

The length of the straps and the connection points between one or more of the webs or straps and the seats of child safety seat assemblies are usually adjustable so that the child safety seat assemblies are able to accommodate children of different sizes. Adjusting the connection points between straps and seats of some conventional child safety seat assemblies can be a cumbersome, time consuming process. Thus, caregivers of children would appreciate a child safety seat assembly having a simple, easy-to-use harness strap retainer apparatus for adjusting the connection point of the harness to the seat.

It is also known that child safety seat assemblies with three- or five-point safety harnesses may include a one- or two-piece sliding clip that is intended to hold the pair of webs or straps in place over the child's shoulders. The pair of webs or straps are generally threaded through a plastic clip, which should rest on the child's chest at approximately armpit-level. Unfortunately, because the plastic clip slides easily to adjust to the size of the child, an active child may soon discover that he or she can slide the plastic clip down, slip the harness webs or straps from his or her shoulders, and climb out of the car seat, whereby these clips will be less effective.

When a child sits in a child safety seat, instances occur when the child exploits extra slack in the harness to slide the harness off the shoulders. This results in an unsafe situation, as the child is no longer strapped in its child safety seat.

Furthermore, new European regulations (R129) states that such child-proof lock assemblies must be opened in a single action and with a force smaller than 15N.

U.S. Pat. No. 5,084,946 discloses a quick disconnect connector. A female member includes an outwardly opening cavity formed by four integrally formed sidewalls. A male member is insertable into the cavity and includes a pair of flexible spring biased arms releasably lockable and extendable into a pair of slots formed in the sidewalls of the female member. Ramps formed on the flexible arms are arranged relative to the slot edges to force the arms inwardly apart from the sidewalls to unlock therefrom when oppositely directed forces are applied to the opposite ends of the male member and female member. Cooperating guide means formed internally on the sidewalls and on a center post are mounted to the male member guide the male member relative to the female member. Slots formed in the opposite ends of the male member and female member mountingly receive belts arranged perpendicularly to the longitudinal axis of the male member and female member.

US 2014/0008960 A1 discloses a harness retainer for use with a juvenile safety seat including a first belt mount that couples to a first harness belt, a second belt mount that couples to a second harness belt and couples to the first belt mount, and a lock that moves from a locked configuration to an unlocked configuration, wherein the lock moves from the locked configuration, blocking movement of the first belt mount away from the second belt mount, to the unlocked configuration, allowing movement of the first belt mount away from the second belt mount.

Publication D1 relates to a restraint safety device, where FIG. 5 shows a preferred embodiment of the restraint safety device. Child safety seat 10 includes a five-point harness system 12. In the five-point harness system 12, a chest clip 18 and buttons 19 have been attached to the shoulder straps 3A and 3B, see also FIGS. 6 and 7A, 7B. In the first preferred embodiment, buttons 19 function as chest clip stops in that they stop the child from sliding chest clip 18 downward or upward, enabling chest clip 18 to remain appropriately positioned over the child's chest. Because chest clip 18 stays positioned over the child's chest, the child is prevented from escaping from the 5-point harness system and remains securely protected by the car seat harness system.

Publication D2 relates to a child restraint harness having a chest clip device, where the child restraint harness 100 may be provided on a child seat 102 having a seat portion 104 and a seatback 106. The child restraint harness 100 can include waist straps 110A and 110B, a crotch strap 112, shoulder straps 114A and 114B, and a fastening buckle 116 held with the crotch strap 112. In one embodiment, the child restraint harness 100 can implement a three-point attachment including two fasteners 120A and 120B operable to engage and lock with the buckle 116. The two fasteners 120A and 120B can include a right fastener 120A connected with the right waist strap 110A and the right shoulder strap 114A, and a left fastener 120B connected with the left waist strap 110B and the left shoulder strap 114B. "Left" and "right" as used herein can refer to the two lateral sides of the child. In one embodiment, the right waist strap 110A and the right shoulder strap 114A can be formed from a same continuous web material that is routed through the right fastener 120A, and the left waist strap 110B and the left shoulder strap 114B can be formed from another continuous web material that is routed through the left fastener 120B. Each of the fasteners 120A and 120B can include a tongue portion adapted to engage through the buckle 116. In addition, the child restraint harness 100 can include a chest clip device 130 operable to properly position the two shoulder straps 114A and 114B.

Publication D3 relates to a child restraint assembly for a child vehicle seat, where FIG. 1 illustrates a child seat 10 that employs a child restraint assembly in accordance with the invention. The child restraint assembly generally includes a chest clip 100, a buckle assembly 200, a harness adjuster 300, and a harness 400 that is threaded through the chest clip 100 and the buckle assembly 200 and that is adjustable via the harness adjuster 300.

Restraining users during travel typically comprises an inefficient process with little flexibility. Accordingly, there exists a need in the art to overcome at least some of the deficiencies and limitations described herein above, or to provide a useful alternative.

Accordingly, a need remains for a child-proof lock assembly in order to overcome the above-noted shortcomings, or to at least provide a useful alternative. The present invention satisfies such a need by providing a harness lock assembly that is easy to use, provides peace of mind to drivers, and greatly increases the safety achieved for a child placed in the child safety seat. Such a child-proof lock assembly keeps a child safely restrained and allows the motorist to concentrate on driving the vehicle. The lock assembly also helps parents avoid expensive tickets for improperly restraining their children, and ultimately saves lives by effectively restraining infants and toddlers in the event of an accident.

These objects are achieved with a shoulder strap positioner according to the following independent claim, with additional embodiments set forth in the dependent claims.

According to the present invention it is provided a shoulder strap positioner for releasably connecting a first and a second strap of a child restraining seat harness, where the shoulder strap positioner comprises a male member configured to be connected to, for instance, said first strap of the child restraining seat harness and a female member configured to be connected to, for instance, said second strap of the child restraining seat harness, where said male member is removably connected to said female member, and where the female member comprises a receptacle provided with an opening for insertion of said male member, the opening being provided over a part of a circumference of said female member, where at least one interior rib furthermore is arranged within the receptacle, and the male member is provided with a corresponding tongue, said male and female members being locked to each other through a movement one way and unlocked from each other through a movement opposite way.

The movement that is used to connect and lock (or vice versa) the male and female members of the shoulder strap positioner to each other may be a rotary movement or a rectilinear movement.

However, it could be envisaged that the male member and female member could also be connected to other parts or elements, for instance shoulder sleeves connected to or being a part of the straps of the child restraining seat harness.

In one exemplary embodiment of the present invention, each of the male and female members may comprise a leg element, where one end of the leg element is connected to or integrated into the male/female member, while an opposite end of the leg element is provided with fastening means, such that the male and female members can be removably connected to, for instance the first and second straps of the child restraining seat harness. Alternatively, the opposite end of the leg element may be connected to or integrated into a plate element, whereby the plate element may be provided with the fastening means over a part or whole of its length. The plate element and the leg element may be arranged to be perpendicular to each other, but it should be understood that the plate element and the leg element may also be arranged to form an angle between them which is smaller or greater than 90 degrees.

The fastening means may, for instance, be Velcro, but a person skilled in the art would understand that also other fastening means could be used to connect the male and female members to the straps of the child restraining seat harness.

The fastener means may be provided on one or both sides of the leg elements or the plate elements.

In one exemplary embodiment, the plate member may have a substantially rectangular form, but it could be envisaged that the plate member could be designed with other forms, for instance an oval form, a square form or the like. Furthermore, the plate element may be provided with a flange or ridge around all of its sides, the flanges or ridges forming a hollow or sunken area in the plate element, in which hollow or sunken area the fastener means can be arranged. The fastening means will then not extend above the flanges or the ridges, whereby the child cannot be injured from the fastening means during the use of the shoulder strap positioner.

The female member comprises further an at least partly hollow receptacle, where the receptacle, may have a substantially annular or a substantially rectangular form, when seen from above. However, it could be envisaged that the receptacle of the female member could be designed with other forms, for instance a polygonal form, an oval form or the like.

The male member comprises further a tongue, where the tongue of the male member can be inserted into the opening provided in the receptacle of the female member in order to lock the male and female members. Furthermore, the tongue of the male member is provided with a groove, where the groove will act with at least one rib provided in the opening in the receptacle of the female member in order to connect and lock the male and female members. The groove may have a width and a depth that is slightly larger a width and a height of the rib, such that the rib can be accommodated in the groove when the male and female members are connected and locked to each other. The groove may have a curved form or a rectilinear form.

The opening provided in the receptacle of the female member is arranged in such a way that it may extend, for instance, over a quarter of the circumference of the receptacle, but the opening could also be arranged to extend over a smaller or larger length of the circumference of the receptacle. The opening may have a varying or fluctuating height over its length, where a first part of the length of the opening may have a height that is twice the height of a height of a second part of the length of the opening. Furthermore, the height of the second part of the length of the opening may be slightly larger than a height of a tongue of the male member. The arrangement of the opening (i.e. the length and the height of the opening), will allow a user to slide the tongue of the male member into the opening provided in the receptacle of the female member, where the male and female member, during this operation, in one exemplary embodiment of the shoulder strap positioner, will form an angle relative each other, whereafter the male and female members are moved relative each other until the tongue of the male member is moved past a rib provided in the receptacle of the female member. When the tongue of the male member is moved past the rib, the male member will be locked to the female member, through the groove and the rib, in which position the male and female members may be aligned co-linear with each other (i.e. form a straight line) and a side of the male member is brought into abutment with a beginning (or end) point of the slit. The child restraining seat harness is then tensioned in order to even further exert a force on the shoulder strap positioner.

When the male and female members are fastened to their respective first and second straps of the child restraining seat harness and the male member is locked to the female member, and the straps of the child restraining seat harness is tensioned, it will not be possible for the child to open the shoulder strap positioner. The first and second straps of the child restraining seat harness will exert outward forces parallel to a horizontal plane of the shoulder strap positioner, preventing the male and female members to be moved and therefore opened.

Figure 1B:
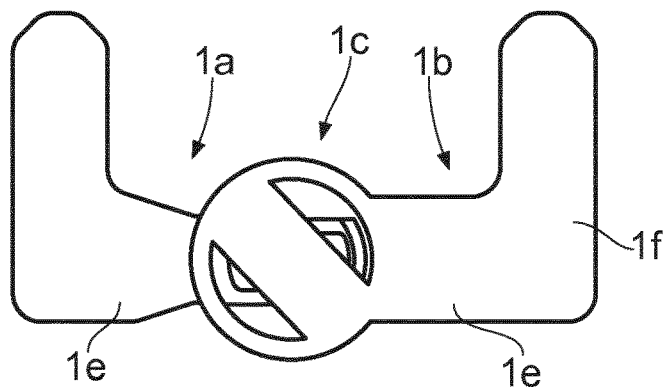
Figure 1C:
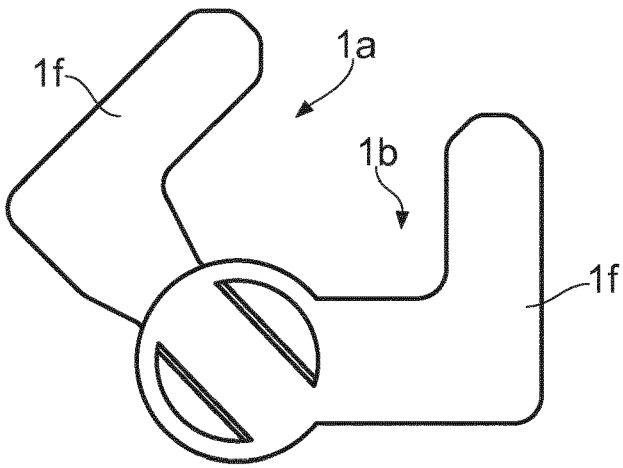
Figure 1D:
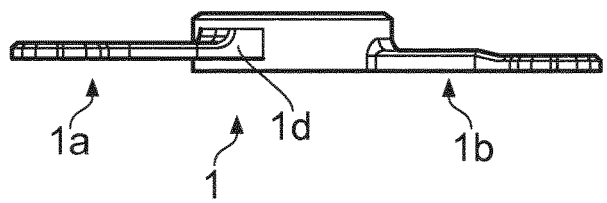
Figure 2A:
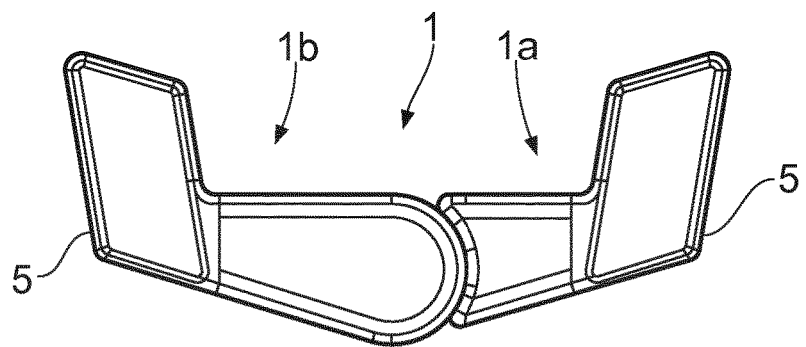
Figure 2B:
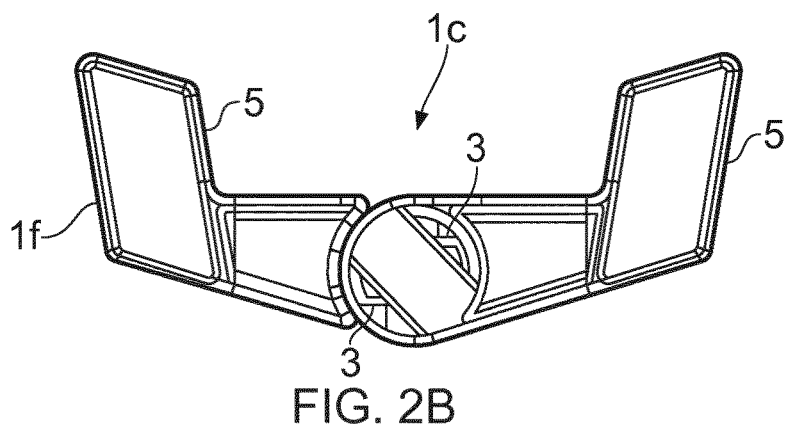
Figure 2C:
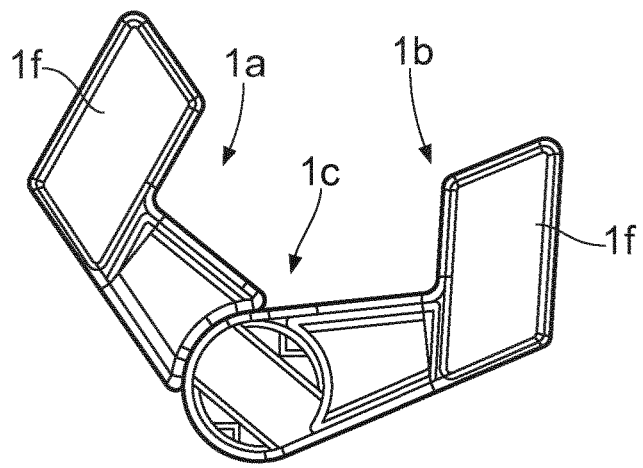
Figure 2D:
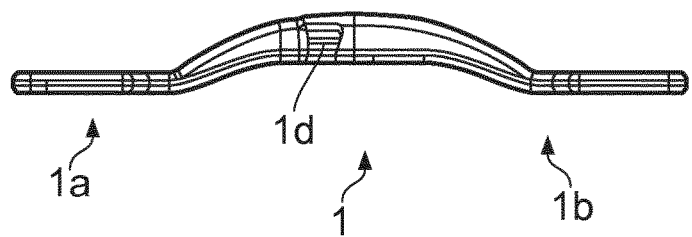
Figure 3A:
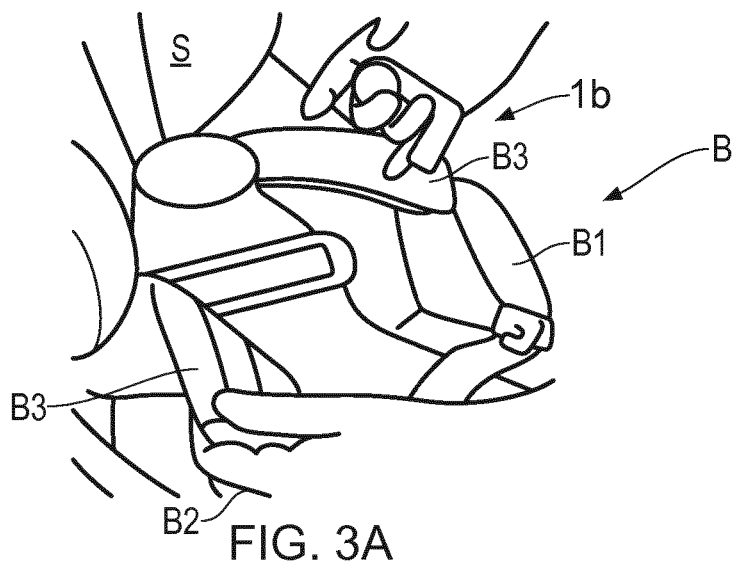
Figure 3B:
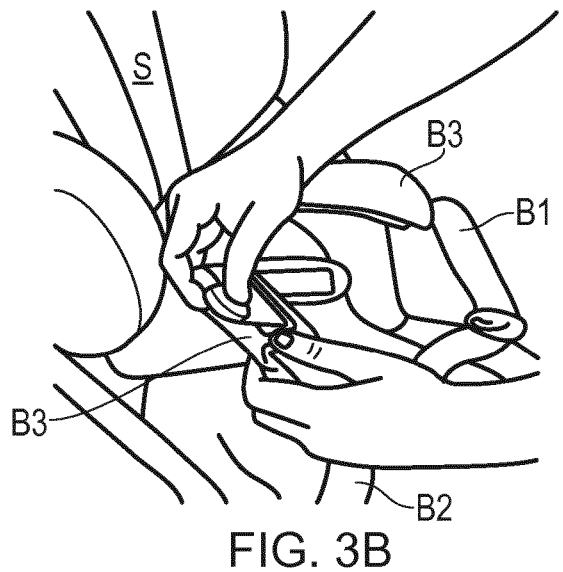
Figure 3C:
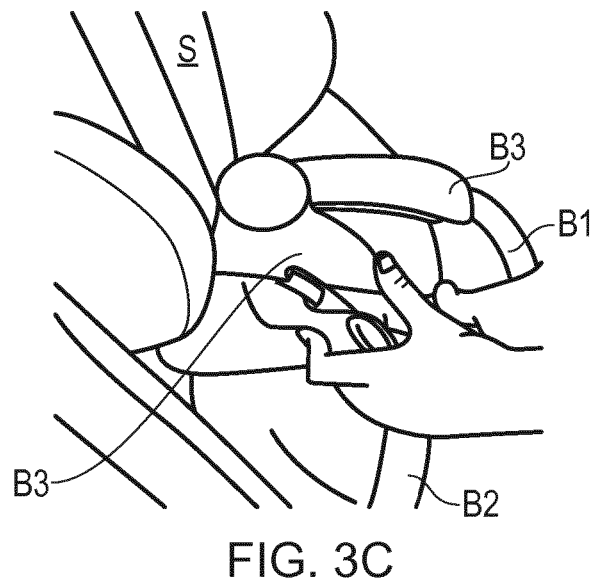
Figure 4A:
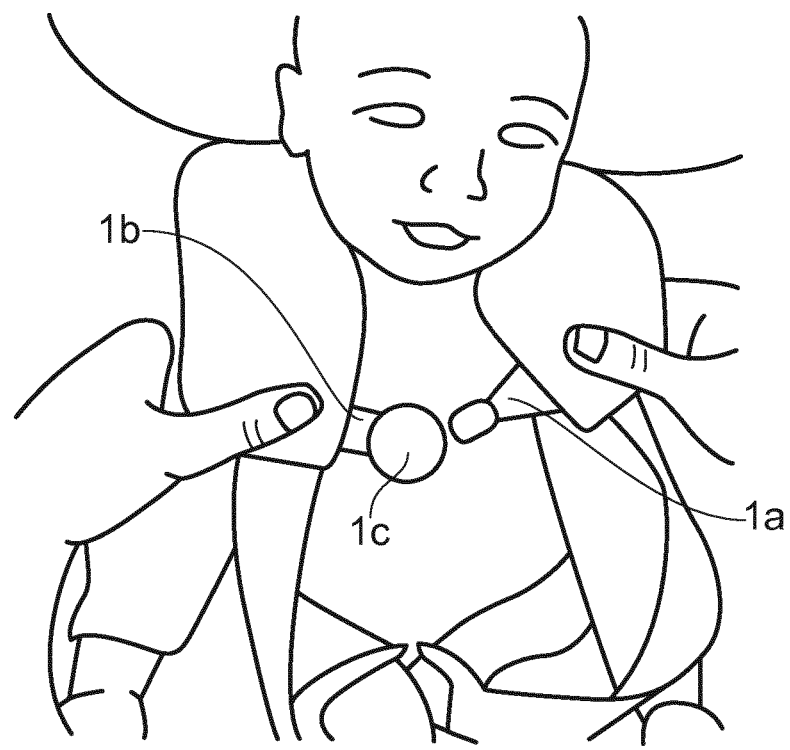
Figure 4A:
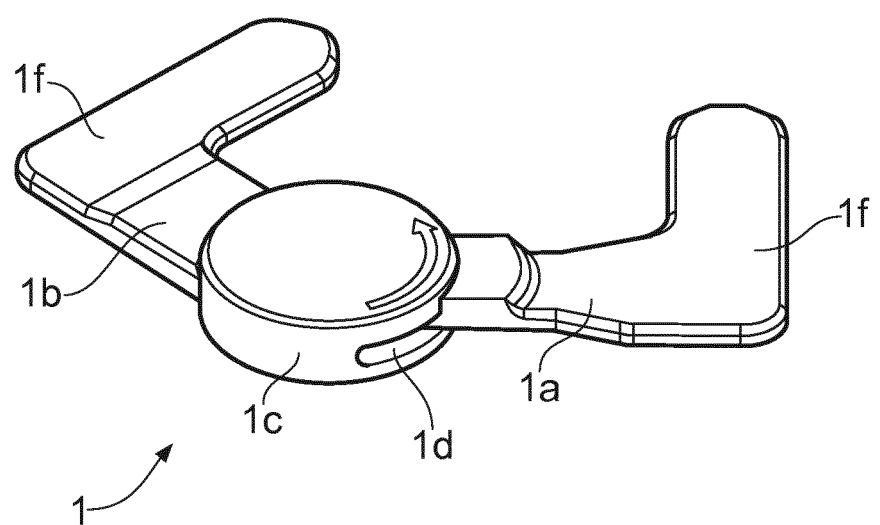
Figure 4B:
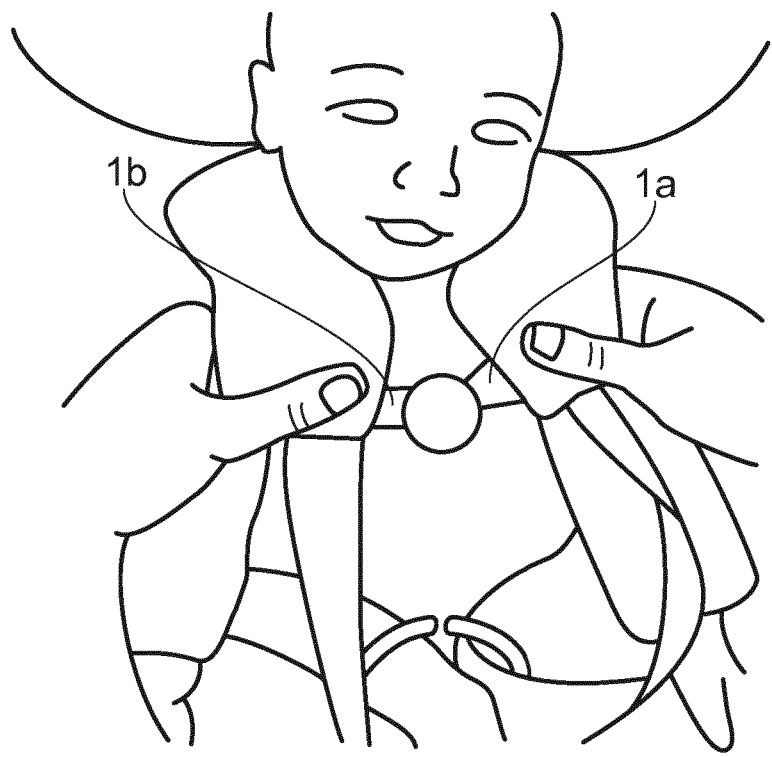
Figure 4B:
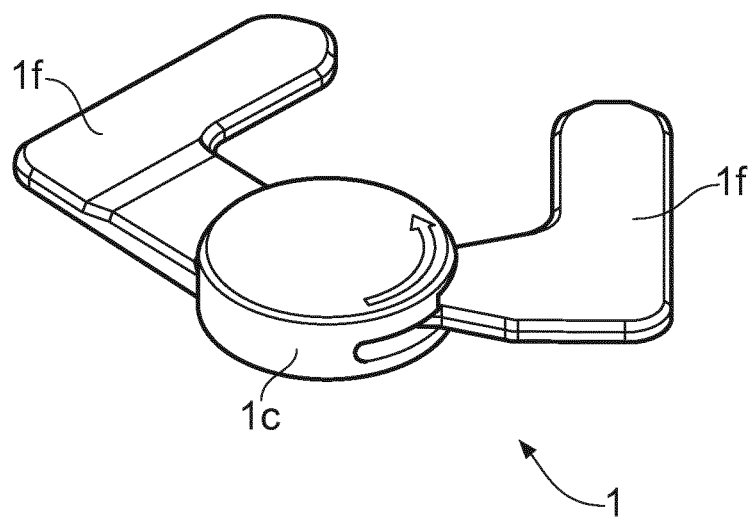
Figure 4C:
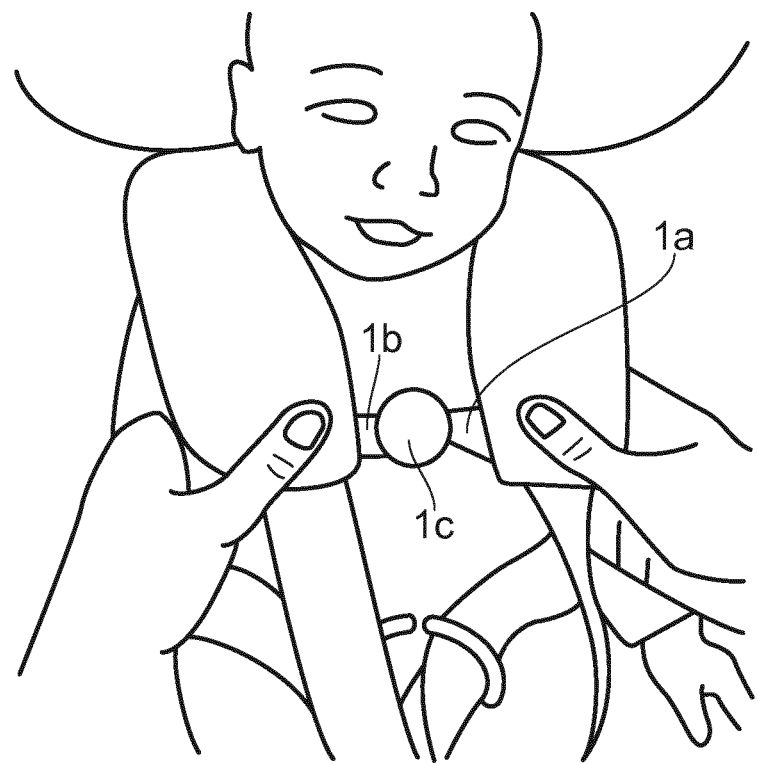
Figure 4C:
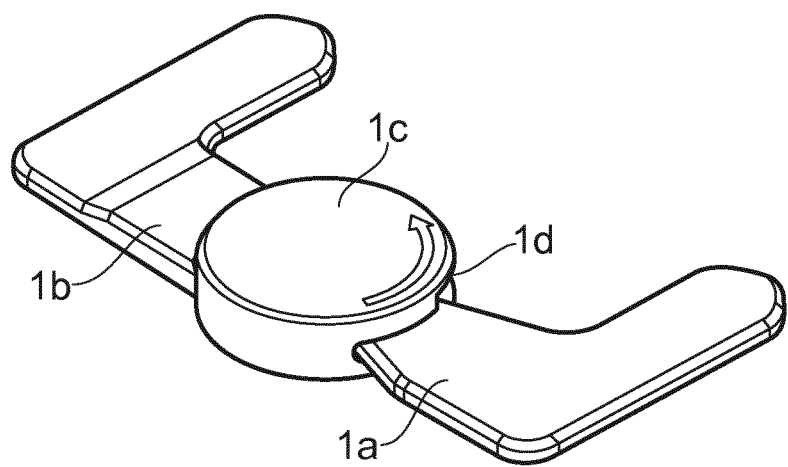
Figure 4D:
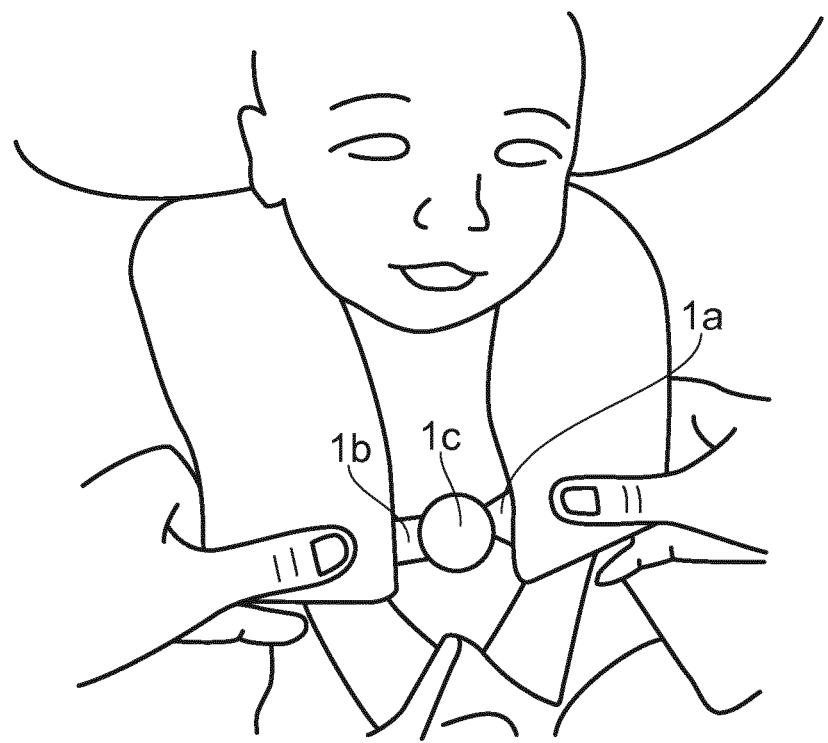
Figure 4D:
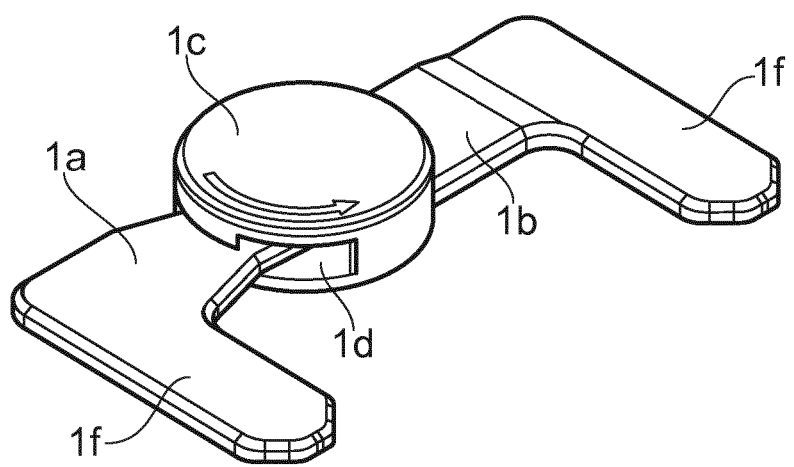
Figure 5A:
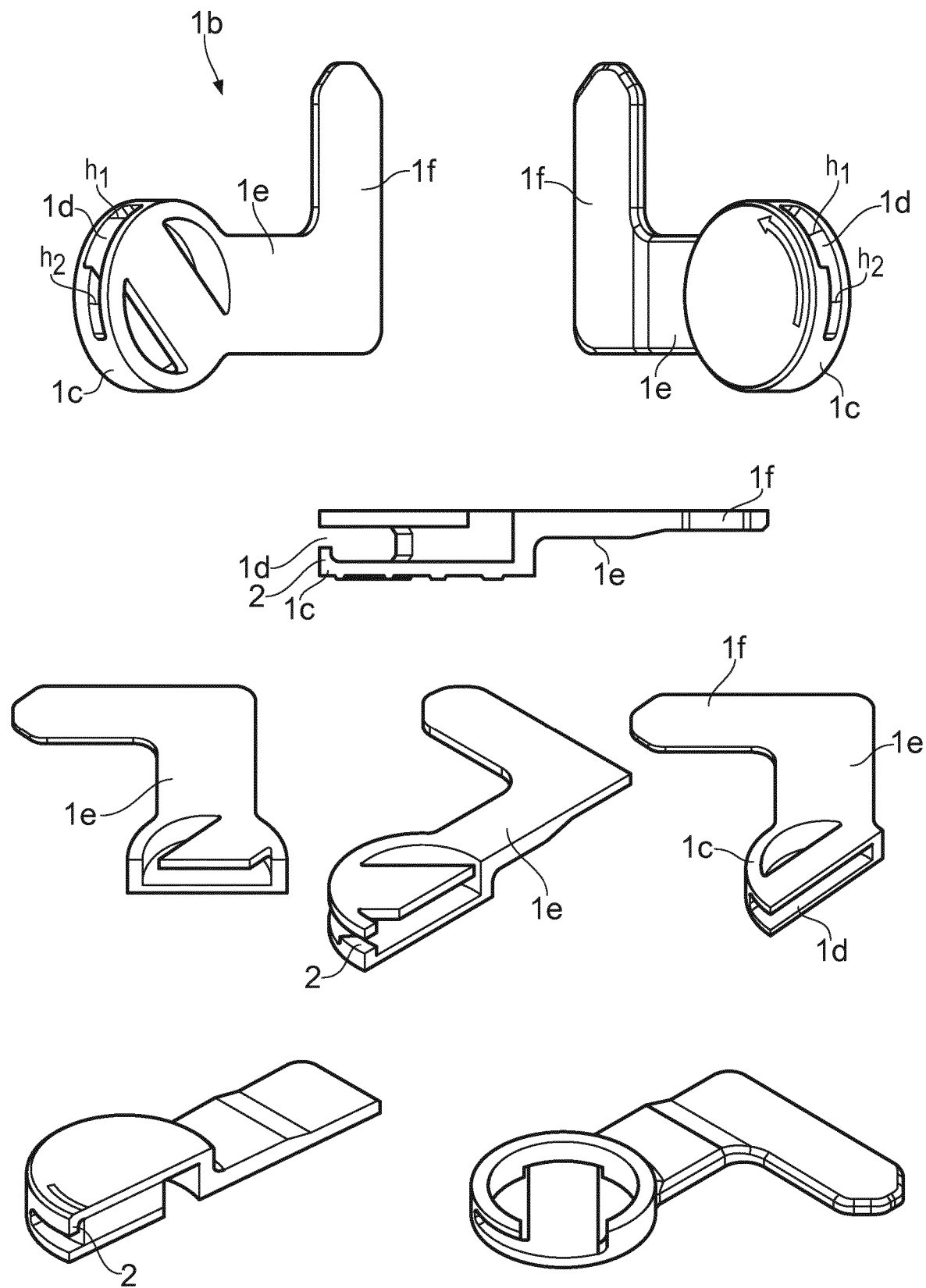
Figure 5B:
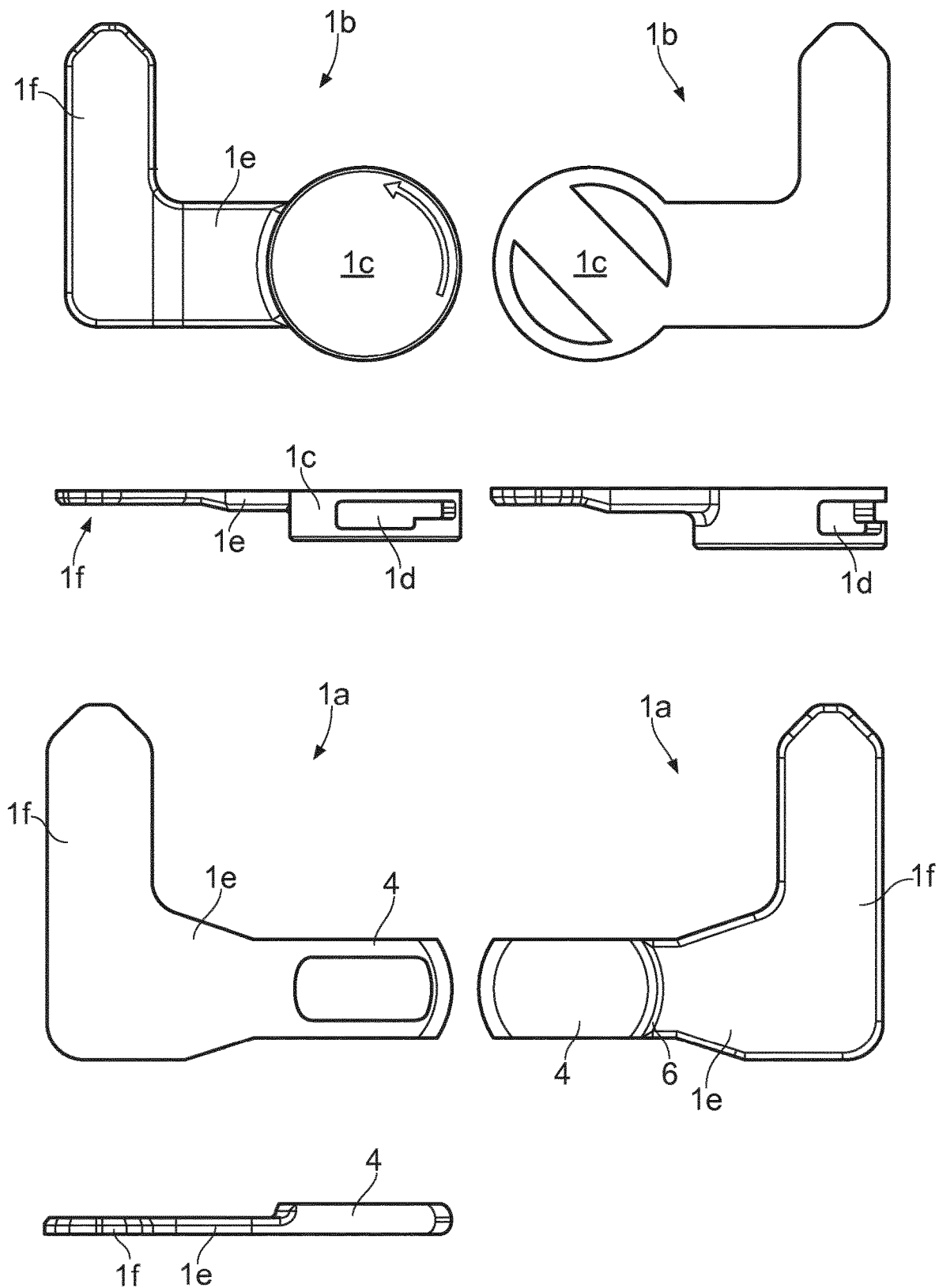
Figure 6A:
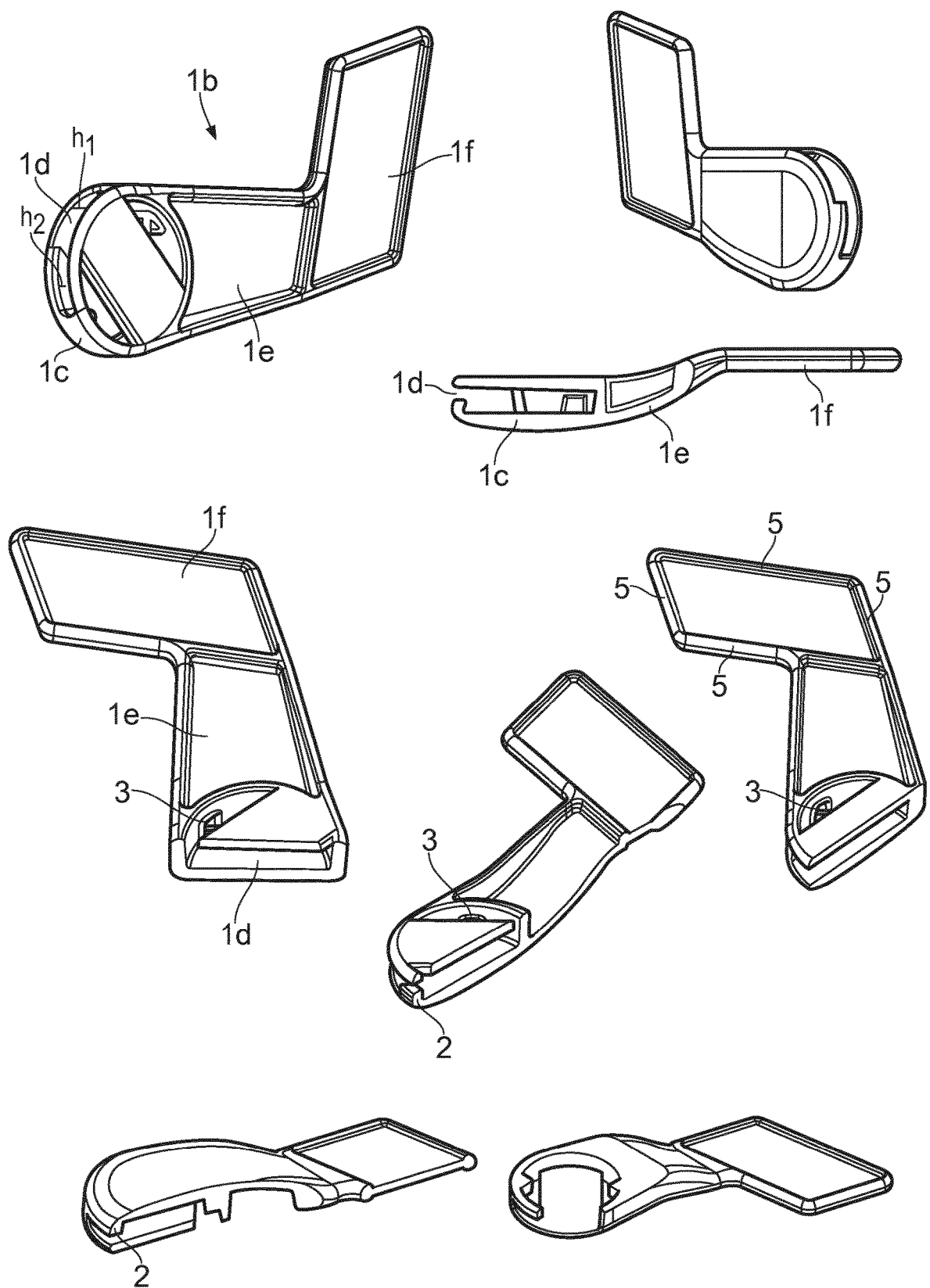
Figure 6B:
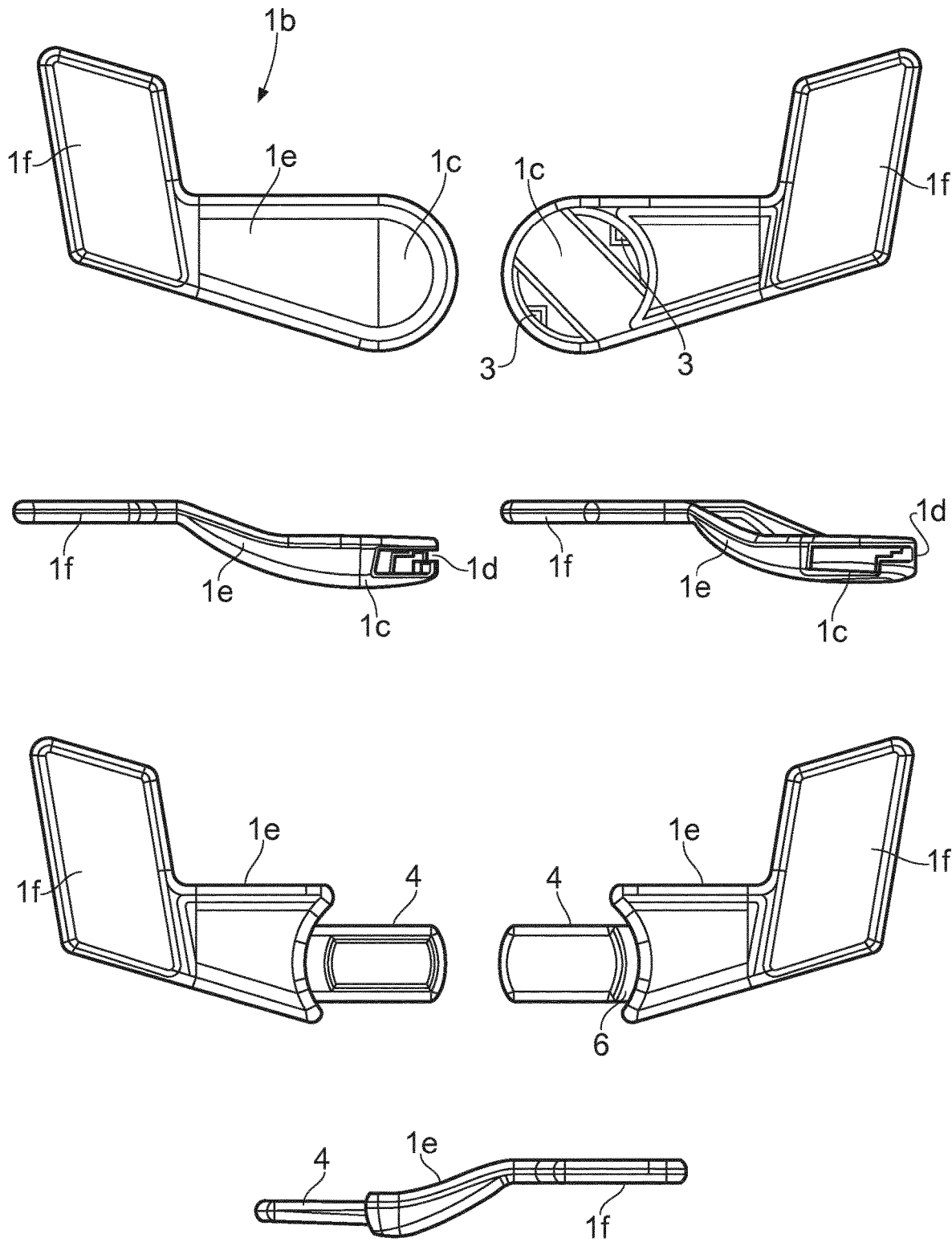
Figure 7A:
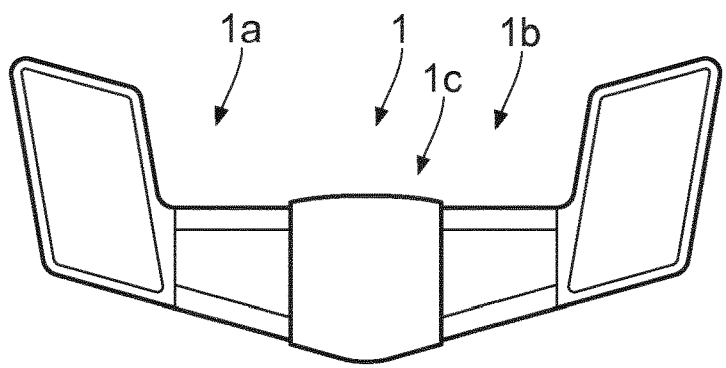
Figure 7B:
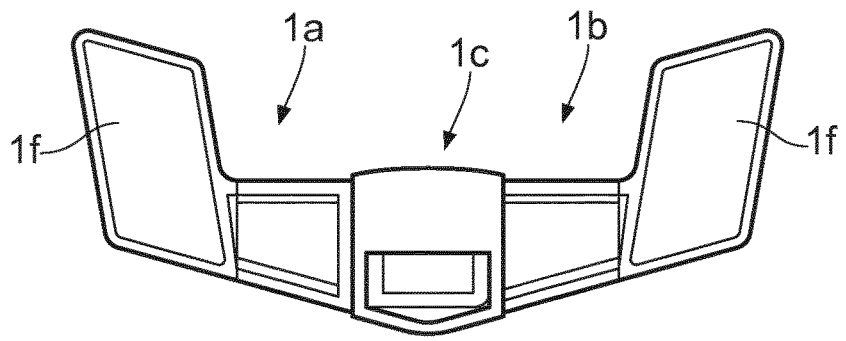
Figure 7C:
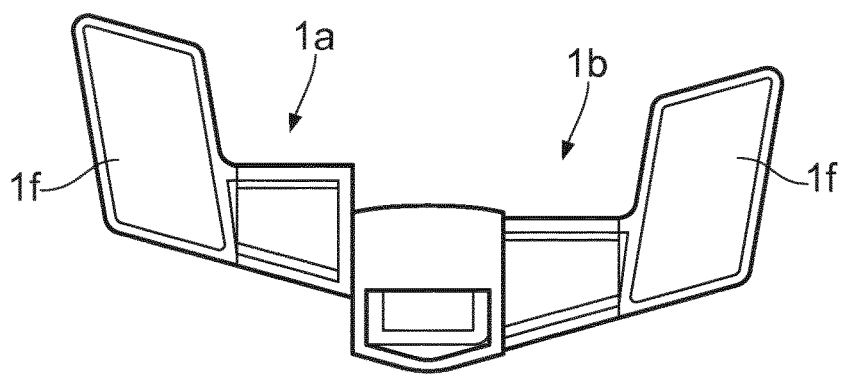
Figure 7D:
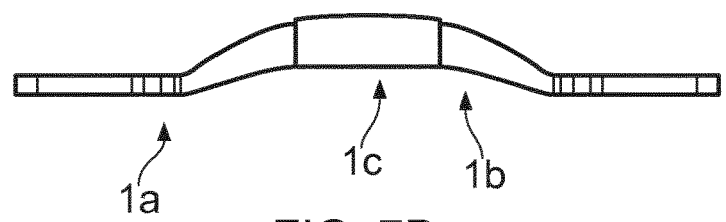
Figure 8A:
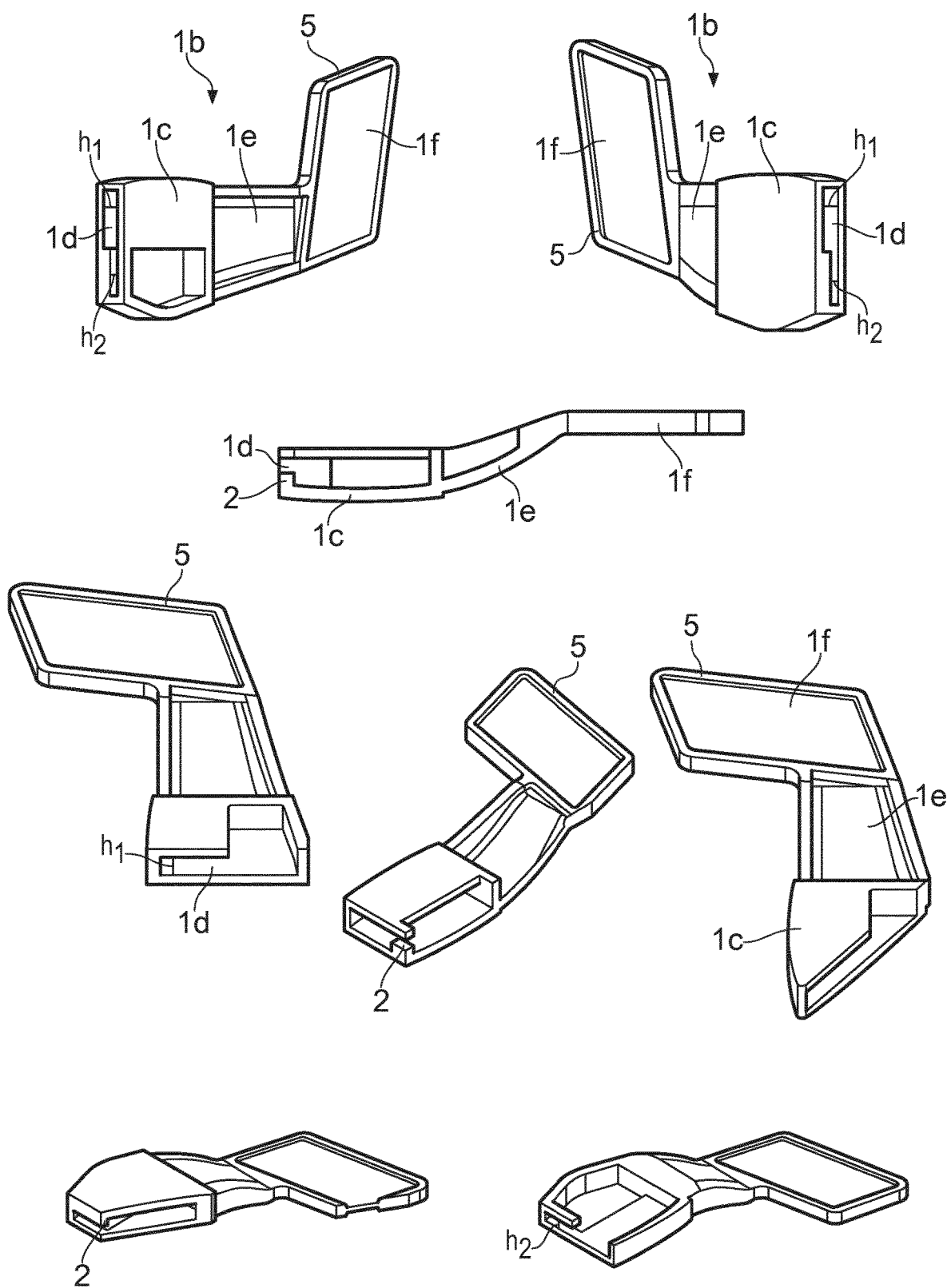

Other advantages and characteristics of the present invention will be apparent from the following detailed description, the appended drawings and the following claims, wherein FIG. 1D show a first embodiment of a shoulder strap positioner according to the present invention, FIG. 1A showing the shoulder strap positioner from above, FIG. 1B showing the shoulder strap positioner from below, in a connected and locked state, FIG. 1C showing the shoulder strap positioner in a state where the shoulder strap positioner is to be connected and locked (or vice versa) and FIG. 1D showing the shoulder strap positioner from side, in a connected and locked state, FIG. 2D show a second embodiment of a shoulder strap positioner according to the present invention, FIG. 2A showing the shoulder strap positioner from above, FIG. 2B showing the shoulder strap positioner from below, in a connected and locked state, FIG. 2C showing the shoulder strap positioner in a state where the shoulder strap positioner is to be connected and locked (or vice versa) and FIG. 2D showing the shoulder strap positioner from side, in a connected and locked state, FIGS. 3A-3C show how the shoulder strap positioner according to FIGS. 1A-1C and 2A-2C can be connected to a child restraining seat harness installed in a child safety seat, FIGS. 4A-4D show how the shoulder strap positioner according to, for instance, FIGS. 1A-1C is used, FIG. 5A shows, in greater detail, the female member of the shoulder strap positioner according to FIGS. 1A-1C, FIG. 5B shows, in greater detail, the male member of the shoulder strap positioner according to FIGS. 1A-1C, FIG. 6A show, in greater detail, the female member of the shoulder strap positioner according to FIGS. 2A-2C, FIG. 6B show, in greater detail, the male member of the shoulder strap positioner according to FIGS. 2A-2C, FIGS. 7A-7D show a third embodiment of a shoulder strap positioner according to the present invention, FIG. 7A showing the shoulder strap positioner from above, FIG. 7B showing the shoulder strap positioner from below, in a connected and locked state, FIG. 7C showing the shoulder strap positioner in a state where the shoulder strap positioner is to be connected and locked (or vice versa) and FIG. 7D showing the shoulder strap positioner from side, in a connected and locked state, FIG. 8A shows, in greater detail, the female member of the shoulder strap positioner according to FIGS. 7A-7D, and FIG. 8B shows, in greater detail, the male member of the shoulder strap positioner according to FIGS. 7A-7D.

In FIGS. 1A-1D and 5A-5B is shown a first exemplary embodiment of a shoulder strap positioner 1 according to the present invention in a connected and locked state, and a state where the shoulder strap positioner 1 is to be connected and locked (or vice versa).

The shoulder strap positioner 1 for releasably connecting a first and second strap B1, B2 of a child restraining seat harness B comprises a male member 1a and a female member 1b, where the male member 1a is configured to be connected to said first strap B1 of the child restraining seat harness B and the female member 1b is configured to be connected to said second strap B2 of the child restraining seat harness B. The child restraining seat harness B may also comprise shoulder sleeves B3, where the shoulder sleeves B3 in appropriate ways then are connected to the straps B1, B2 of the child restraining seat harness B, or to a child safety seat S. A person skilled in the art would know how this is done, whereby this is not described any further herein.

Furthermore, the male member 1a and the female member 1b can be releasably connected to each other, where the shoulder strap positioner 1, when the male and female members 1a, 1b are connected and locked to each other, will prevent that a child can unlock the shoulder strap positioner 1 and thereafter remove the straps B1, B2 of the child restraining seat harness B from its shoulders when seated in a child safety seat S.

The female member 1b comprises an at least partly hollow receptacle 1c which is provided with an opening 1d for insertion of a tongue 4 of the male member 1a, the opening 1d leading into the hollow, where the opening 1d is provided over a part of a circumference of the female member 1b. The opening 1d may have a length that will be a quarter of the circumference of the receptacle 1c, such that the tongue 4 of the male member 1a can be inserted into the hollow receptacle 1c of the female member 1b through the opening 1d and thereafter rotated relative to the female member 1b in order to be brought to a locking position with the female member 1b.

A first part of the opening 1d is provided with a length having a height h1, and a second part of the opening 1d is provided with a length having a height h2. The height h1 of the first part may, for instance, be twice the height h2 of the second part of the opening 1d, and the height h2 of the second part of the opening 1d may, for instance, be slightly larger than a thickness of the tongue 4 of the male member 1a.

The transition between the first part and the second part of the opening 1d, i.e. the first height h1 and the second height h2 of the opening 1d is abrupt, i.e. the first height h1 will be narrowed to the second height h2 through a substantially vertical restriction v.

The receptacle 1c will be provided with a rib 2 (see FIG. 5A), where the rib 2 will extend over the length of the second part of the opening 1d, and along the circumference of the receptacle 1d.

The receptacle 1c is further provided with a number of internal protrusions or ribs 3 on its hollow inside, where the internal protrusions or ribs 3 will face toward a center of the hollow. These internal protrusions or ribs 3 will act like rotation stoppers for the tongue 4 of the male member 1a, whereby the male member 1a will be prevented from further rotation relative the female member 1b when the male member 1a is brought into abutment with the internal protrusions or ribs 3.

The male member 1a comprises a tongue 4 which is configured to be inserted the opening 1d of the female member 1b, and thereafter rotated in the opening 1d.

Each of the male and female member 1a, 1b comprises a leg member 1e, which leg member 1e of the female member 1b, through one of its ends, in appropriate ways is connected to the receptacle 1c of the female member 1b and which leg member 1e of the male member 1a, through one of its ends, in appropriate ways is connected to the tongue 4 of the male member 1a. An opposite end of the leg member 1e is, in appropriate ways, connected to a plate element 1f, where the plate element 1*f* is to be connected to the first or second strap of the child restraining seat harness, whereby the plate element 1*f* is provided with fastening means on both of its sides (i.e. an upper surface and a lower surface). The fastening means may be Velcro or the like.

The plate elements 1*f* are provided with a small flange or ridge 5 around all of their sides, such that there is provided a hollow or sunken area on both sides of the plate element 1*f*, where the fastenings means, for instance Velcro, is arranged in the hollow or sunken area of the plate element 1*f* in order to prevent discomfort for the child.

The tongue 4 of the male member 1*a* will, towards an end of the tongue 4 that is connected to the leg element 1*e*, be provided with a groove 6 (see FIGS. 5B and 6B). The groove 6 is curved, such that the male member 1*a* could be rotated relative the female member 1*b*.

When the tongue 4 of the male member 1*a* is inserted into the opening 1*d*, the male and female members 1*a*, 1*b* will form an angle relative each other, and when the male member 1*a* is locked to the female member 1*b*, the male and female members 1*a*, 1*b* will be aligned with each other and form a straight line.

FIG. 1C shows the shoulder strap positioner 1 in a state where the shoulder strap positioner 1 is to be locked (or unlocked). The tongue 4 of the male member 1*a* is inserted into the first part of the opening 1*d* provided in the receptacle 1*c* of the female part 1*b*, the first part having the height h1, and thereafter the male part 1*a* is rotated towards the second part of the opening 1*d*. Through the movement, the rib 2 will be brought into contact with and accommodated in the groove 6 provided in the tongue 4 of the male member 1*a*. As the rib 2 protrude into the groove 6, the male and female members 1*a*, 1*b* will be connected and locked to each other.

FIG. 1D shows the shoulder strap positioner 1 from a side, where it can be seen that the shoulder strap positioner 1 has a substantially rectilinear design, i.e. a surface facing towards the child, when the shoulder strap positioner 1 is connected to the first and second strap B1, B2 of a child restraining seat harness B, is substantially flat.

FIGS. 2A-2D and 6A-6B show a second exemplary embodiment of a shoulder strap positioner according to the present invention.

The female member 1*b* comprises an at least partly hollow receptacle 1*c* which is provided with an opening 1*d* for insertion of a tongue 4 of the male member 1*a*, where the opening 1*d* is provided over a part of a circumference of the female member 1*b*. The opening 1*d* may have a length that will be a quarter of the circumference of the receptacle 1*c*, such that the tongue 4 of the male member 1*a* can be inserted into the receptacle 1*c* of the female member 1*b* through the opening 1*d* and thereafter rotated relative to the female member 1*b* in order to be brought to a locking position with the female member 1*b*.

A first part of the opening 1*d* is provided with a length having a height h1, and a second part of the opening 1*d* is provided with a length having a height h2. The height h1 of the first part may, for instance, be twice the height h2 of the second part of the opening 1*d*, and the height h2 of the second part of the opening 1*d* may, for instance, be slightly larger than a thickness of the tongue 4 of the male member 1*a*.

The transition between the first part and the second part of the opening 1*d*, i.e. the first height h1 and the second height h2 of the opening 1*d* is abrupt, i.e. the first height h1 will be narrowed to the second height h2 through a substantially vertical restriction v.

The receptacle 1*c* will be provided with a rib 2 (see FIG. 6A), where the rib 2 will extend over the length of the second part of the opening 1*d*, and along the circumference of the receptacle 1*d*.

The receptacle 1*c* is further provided with a number of internal protrusions or ribs 3 on its hollow inside, where the internal protrusions or ribs 3 will face toward a center of the hollow. These internal protrusions or ribs 3 will act like rotation stoppers for the tongue 4 of the male member 1*a*, whereby the male member 1*a* will be prevented from further rotation relative the female member 1*b* when the male member 1*a* is brought into abutment with the internal protrusions or ribs 3.

The male member 1*a* comprises a tongue 4 which is configured to be inserted the opening 1*d* of the female member 1*b*, and thereafter rotated in the opening 1*d*.

Each of the male and female member 1*a*, 1*b* comprises a leg member 1*e*, which leg member 1*e* of the female member 1*b*, through one of its ends, in appropriate ways is connected to the receptacle 1*c* of the female member 1*b* and which leg member 1*e* of the male member 1*a*, through one of its ends, in appropriate ways is connected to the tongue 4 of the male member 1*a*. An opposite end of the leg member 1*e* is connected to or integrated to a plate element 1*f*. In this embodiment, the plate element 1*f* and the leg element 1*e* are arranged to form an angle of, for instance, approximately 10 degrees between them, whereby the plate element 1*f* will be parallel with the straps B1, B2 of the child restraining seat harness B when the shoulder strap positioner 1 is connected to the straps B1, B2 of the child restraining seat harness B and the male and female members 1*a*, 1*b* are locked to each other. Through this arrangement of the leg member 1*e* and the plate element 1*f* no part of the shoulder strap positioner will be in direct contact with the child.

The plate element 1*f* is to be connected to the first or second strap of the child restraining seat harness, whereby the plate element 1*f* is provided with fastening means on both of its sides (i.e. an upper surface and a lower surface). The fastening means may be Velcro or the like.

Furthermore, the plate elements 1*f* are provided with a small flange or ridge 5 around all of their sides, such that there is provided a hollow or sunken area on both sides of the plate element 1*f*, where the fastenings means, for instance Velcro, is arranged in the hollow or sunken area in order to prevent discomfort for the child.

The tongue 4 of the male member 1*a* will, towards an end of the tongue 4 that is connected to the leg element 1*e*, be provided with a groove 6 (see FIGS. 5B and 6B). The groove 6 is curved, such that the male member 1*a* could be rotated relative the female member 1*b*.

FIG. 2C shows the shoulder strap positioner 1 in a state where the shoulder strap positioner 1 is to be locked (or unlocked). The tongue 4 of the male member 1*a* is inserted into the first part of the opening 1*d* provided in the receptacle 1*c* of the female part 1*b*, the first part having the height h1, and thereafter the male part 1*a* is rotated towards the second part of the opening 1*d*. Through the movement, the rib 2 will be brought into contact with and accommodated in the groove 6 provided in the tongue 4 of the male member 1*a*. As the rib 2 protrude into the groove 6, the male and female members 1*a*, 1*b* will be connected and locked to each other.

FIG. 2D shows the shoulder strap positioner 1 from a side, where it can be seen that the shoulder strap positioner 1 has a substantially concave design, i.e. a surface facing towards the child, when the shoulder strap positioner 1 is connected to the first and second strap B1, B2 of a child restraining seat harness B, is substantially concave.

FIGS. 3A-3C show how the shoulder strap positioner 1 according to FIGS. 1A-1D, 2A-2D and 7A-7D is connected to the child restraining seat harness B installed in a child seat S, where it can be seen that the male member 1a, through the fastening means, is connected to the first strap B1 of the child restraining seat harness B, and the female member 1b is connected to the second strap B2 of the child restraining seat harness B. Alternatively, the male and female members 1a, 1b may be connected to shoulder sleeves B3 of the child restraining seat harness B, if the child restraining seat harness B comprises such shoulder sleeves B3. However, as a person skilled in the art would know how this can be done, this is not described any further herein.

In FIGS. 4A-4D is shown how the shoulder strap positioner 1 according to, for instance FIGS. 1A-1D is used. In FIG. 4A a child is placed in a child safety seat S, and the straps B1, B2 of the child restraining seat harness B are then arranged over the shoulders of the child. The tongue 4 of the male member 1a is then inserted into the first part of the opening 1d provided in the receptacle 1c of the female member 1b. In FIGS. 4B and 4C the male member 1a is rotated towards the second part of the opening 1d provided in the receptacle 1c of the female member 1b in order to bring the groove 6 provided in the tongue 4 into contact with the rib 2 of the opening 1d. When the rib 2 is brought into contact and accommodated in the groove 6, the male and female members 1a, 1b of the shoulder strap positioner 1 will be connected and locked to each other. In FIG. 4D is shown that the child restraint seat harness B is tensioned in order to even further exert a force on the shoulder strap positioner 1, whereby the child cannot open the shoulder strap positioner 1.

FIG. 6B show a male member 1a of another exemplary embodiment of a shoulder strap positioner 1 according to the present invention, where the male member 1a is to be used with the female member according to FIG. 6A.

The male member 1a comprises a leg member 1e, where the leg member 1e, through one of its ends, is connected or integrated to the tongue 4 of the male member 1a. An opposite end of the leg member 1e is connected to or integrated to a plate element 1f. As described in accordance with FIGS. 2A-2D, in this embodiment the plate element 1f and the leg element 1e are arranged to form an angle of 10 degrees between them, whereby the plate element 1f will be parallel with the straps B1, B2 of the child restraining seat harness B when the shoulder strap positioner 1 is connected to the straps B1, B2 of the child restraining seat harness B and the male and female members 1a, 1b are connected and locked to each other. Through this arrangement of the leg member 1e and the plate element 1f no part of the shoulder strap positioner will be in direct contact with the child.

Furthermore, the end of the leg member 1e that is connected to or integrated to the tongue 4 of the male member 1a has a curved termination, where this curved termination has the same form as the groove 6 provided in the tongue 4.

In FIGS. 7A-7D and 8A-8B is shown a third embodiment of a shoulder strap positioner 1 according to the present invention, where the female member 1b comprises at least a partly hollow receptacle 1c which is provided with an opening 1d for insertion of a tongue 4 of the male member 1a. The receptacle 1c has a substantially rectangular or quadratic form, where the opening 1d is provided in one of the sides of the receptacle 1c.

A first part of the opening 1d is provided with a length having a height h1, and a second part of the opening 1d is provided with a length having a height h2. The height h1 of the first part may, for instance, be twice the height h2 of the second part of the opening 1d, and the height h2 of the second part of the opening 1d may, for instance, be slightly larger than a thickness of the tongue 4 of the male member 1a.

The transition between the first part and the second part of the opening 1d, i.e. the first height h1 and the second height h2 of the opening 1d is abrupt, i.e. the first height h1 will be narrowed to the second height h2 through a substantially vertical restriction v. However, it should be understood that the transition could be sloping.

The receptacle 1c is provided with a rib 2 (see FIG. 8A), where the rib 2 will extend over the length of the second part of the opening 1d.

The male member 1a comprises a tongue 4 which is configured to be inserted the opening 1d of the female member 1b, and thereafter moved along the opening 1d.

Each of the male and female member 1a, 1b comprises a leg member 1e, which leg member 1e, of the female member 1b, through one of its ends, in appropriate ways is connected to the receptacle 1c of the female member 1b and which leg member 1e of the male member 1a, through one of its ends, in appropriate ways is connected to the tongue 4 of the male member 1a. An opposite end of the leg member 1e is connected to or integrated to a plate element 1f. In this exemplary embodiment, the plate element 1f and the leg element 1e are arranged to form an angle of, for instance, approximately 10 degrees between them, whereby the plate element 1f will be parallel with the straps B1, B2 of the child restraining seat harness B when the shoulder strap positioner 1 is connected to the straps B1, B2 of the child restraining seat harness B and the male and female members 1a, 1b are locked to each other. Through this arrangement of the leg member 1e and the plate element 1f no part of the shoulder strap positioner will be in direct contact with the child.

The plate element 1f is to be connected to the first or second strap of the child restraining seat harness B, whereby the plate element 1f is provided with fastening means on both of its sides (i.e. an upper surface and a lower surface). The fastening means may be Velcro or the like.

Furthermore, the plate elements 1f are provided with a small flange or ridge 5 around all of their sides, such that there is provided a hollow or sunken area on both sides of the plate element 1f, where the fastenings means, for instance Velcro, is arranged in the hollow or sunken area in order to prevent discomfort for the child.

Figure 8B:
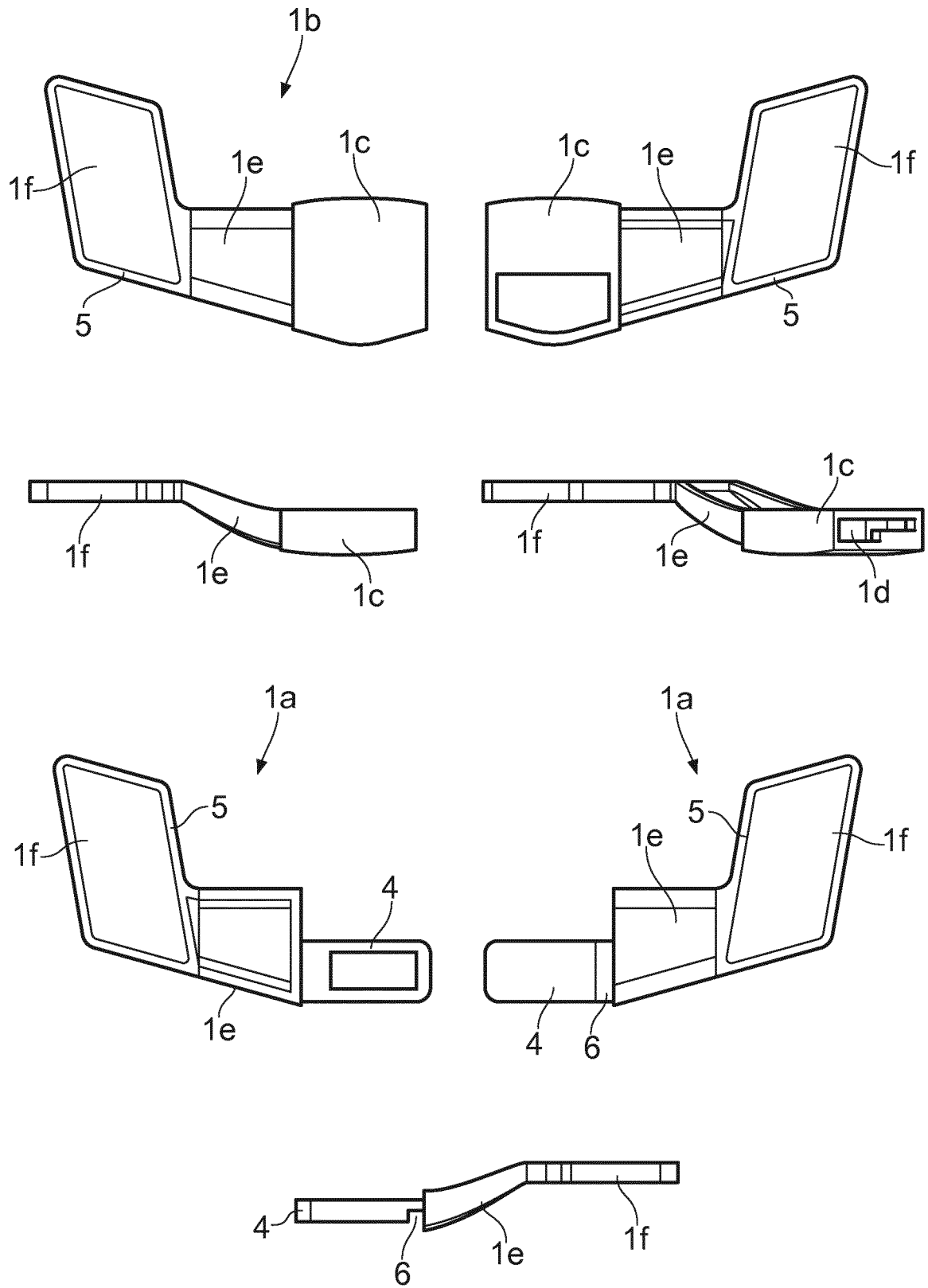

The tongue 4 of the male member 1a will, towards an end of the tongue 4 that is connected to the leg element 1e, be provided with a groove 6 (see FIG. 8B). The groove 6 is rectilinear, such that the male member 1a could be moved rectilinearly relative the female member 1b.

FIG. 7C shows the shoulder strap positioner 1 in a state where the male and female members 1a, 1b of the shoulder strap positioner 1 are to be locked (or unlocked). The tongue 4 of the male member 1a is inserted into the first part of the opening 1d provided in the receptacle 1c of the female part 1b, the first part having the height h1, and thereafter the male part 1a is moved rectilinearly towards the second part of the opening 1d. Through the movement, the rib 2 will be brought into contact with and accommodated in the groove 6 provided in the tongue 4 of the male member 1a. As the rib 2 protrude into the groove 6, the male and female members 1a, 1b will be connected and locked to each other.

FIG. 8D shows the shoulder strap positioner 1 from a side, where it can be seen that the shoulder strap positioner 1 has a substantially concave design, i.e. a surface facing towards the child, when the shoulder strap positioner 1 is connected to the first and second strap B1, B2 of a child restraining seat harness B, is substantially concave.

The invention has now been explained with the aid of non-limiting exemplary embodiments. A person of skill in the art will understand that a number of variations and modifications can be made to the shoulder strap positioner as described within the scope of the invention as described in the appended claims.

The invention claimed is:

1. A shoulder strap positioner for releasably connecting a first and a second strap of a child restraining seat harness, the shoulder strap positioner comprising a male member configured to be connected to the first strap of the child restraining seat harness and a female member configured to be connected to the second strap of the child restraining seat harness, wherein said male member is removably connected to said female member, wherein the female member comprises a receptacle provided with an opening for insertion of said male member, the opening being provided over a part of a circumference of said receptacle of the female member, where at least one rib is provided over a part of the opening, and where the male member comprises a tongue provided with a groove, the male and female members being locked to each other through a movement of the male member towards the at least one rib, the at least one rib being brought into contact and accommodated in the groove through this movement, and released from each other through a movement of the male member away from the at least one rib, wherein the movement is a rotary movement.

2. A shoulder strap positioner according to claim 1, wherein each of the male and female members comprises a leg member extending out from the respective male and female member, and a plate element, where fastening means are provided at least over a part of each plate element.

3. A shoulder strap positioner according to claim 2, wherein the receptacle of the female member has a substantially annular or rectangular form.

4. A shoulder strap positioner according to claim 1, wherein the opening is a through-going opening over at least a quarter of the circumference of said female member.

5. A shoulder strap positioner according to claim 2, wherein the fastening means comprises Velcro.

6. A shoulder strap positioner according to claim 1, wherein a first part of the opening has a height that is at least a height of a tongue of the male member.

7. A shoulder strap positioner according to any one of the preceding claims, wherein the opening comprises a first part and a second part, the first part having a height and the second part having a height.

8. A shoulder strap positioner according to claim 2, wherein the plate element is provided with a flange or ridge around all of its sides.

9. A shoulder strap positioner according to claim 2, wherein the leg member of the male member, at an end connected to or integrated to the tongue, has a curved termination.

10. A shoulder strap positioner according to claim 1, wherein the receptacle is provided with a plurality of internal protrusions or ribs.

11. A shoulder strap positioner according to claim 1, wherein the shoulder strap positioner has a concave shape.

12. A shoulder strap positioner according to claim 1, wherein the receptacle comprises a hollow, where the opening leads into the hollow.

13. A shoulder strap positioner according to claim 2, wherein the leg member and the plate element form an angle between them, the angle preferably being 4-20 degrees, more preferably 7-15 degrees.

14. A shoulder strap positioner according to claim 1, wherein the tongue has a tapering form over its length.

15. A shoulder strap positioner according to claim 10, wherein the protrusions or ribs are arranged diametrically opposite each other inside the hollow.

16. A shoulder strap positioner according to claim 1, wherein the groove has a curved or rectilinear form.

17. A shoulder strap positioner according to claim 1, wherein the movement is a rectilinear movement.

18. A shoulder strap positioner according to claim 7, wherein the first part of the opening has a length that is at least a width of the tongue of the male member.

* * * * *